(12) United States Patent
Walter et al.

(10) Patent No.: US 6,371,313 B1
(45) Date of Patent: Apr. 16, 2002

(54) SYSTEM OF SUPPORTING BARS FOR USE IN GOODS AND SERVICES ESTABLISHMENTS

(75) Inventors: Herbert Walter, Mullheim; Manfred Uecker, Rheinfelden, both of (DE)

(73) Assignee: Visplay IG AG, Muttenz (SE)

( * ) Notice: Subject to any disclaimer, the term of this patent is extended or adjusted under 35 U.S.C. 154(b) by 0 days.

(21) Appl. No.: 09/623,947

(22) PCT Filed: Feb. 15, 1999

(86) PCT No.: PCT/CH99/00069

§ 371 Date: Sep. 12, 2000

§ 102(e) Date: Sep. 12, 2000

(87) PCT Pub. No.: WO99/20094

PCT Pub. Date: Apr. 29, 1999

(30) Foreign Application Priority Data

Mar. 13, 1998 (EP) .............................................. 98810212

(51) Int. Cl.⁷ .................................................. A47F 5/00
(52) U.S. Cl. ..................... 211/123; 211/182; 211/105.1; 211/204; 248/220.31
(58) Field of Search ............................... 211/105.1, 123, 211/57.1, 59.1, 87.01, 204, 182; 248/220.31, 221.11, 222.11

(56) References Cited

U.S. PATENT DOCUMENTS

| | | | | |
|---|---|---|---|---|
| 2,516,907 A | * | 8/1950 | Penfold | |
| 3,639,950 A | * | 2/1972 | Lutz et al. | |
| 4,223,862 A | * | 9/1980 | Doughty | 211/105.1 X |
| 5,100,075 A | * | 3/1992 | Morand | 211/123 X |
| 5,186,341 A | * | 2/1993 | Zeid | 211/204 |
| 5,301,912 A | * | 4/1994 | Chang | |
| 5,961,082 A | * | 10/1999 | Walter | 211/87.01 X |
| 6,085,916 A | * | 7/2000 | Kovacevic et al. | 211/87.01 X |
| 6,182,937 B1 | * | 2/2001 | Sanderse | 248/220.31 X |

FOREIGN PATENT DOCUMENTS

| | | |
|---|---|---|
| EP | 0332377 | 9/1989 |
| EP | 0716825 | 6/1996 |
| EP | 0791315 | 8/1997 |
| FR | 1293293 | 10/1962 |
| WO | 9618329 | 6/1996 |
| WO | 9622469 | 7/1996 |
| WO | 9726809 | 7/1997 |

* cited by examiner

Primary Examiner—Robert W. Gibson, Jr.
(74) Attorney, Agent, or Firm—Selitto, Behr & Kim

(57) ABSTRACT

The supporting-bar arrangement serves for hanging, directly or indirectly, articles which are to be displayed in goods and services establishments. A fundamental constituent part is formed by a support bar which has, at the front, a plug-in end which can be plugged with arresting into an axial inlet opening in a plug-in sleeve or directly into an inlet opening in a supporting structure. The plug-in sleeve is fixed in a through-passage of the supporting structure. A hook contour is provided at the plug-in end, and the plugged-in support bar is arrested in different ways, A spring element is provided in the plug-in sleeve for latching the hook contour of the support bar when the support bar is plugged into the axial inlet opening. The support bar itself serves for hanging articles, or a goods carrier is secured on one or more support bars. The supporting-bar arrangement extends, in particular, the individual and high-quality design possibilities in the construction of shops and trade fairs.

10 Claims, 12 Drawing Sheets

Figure 1:
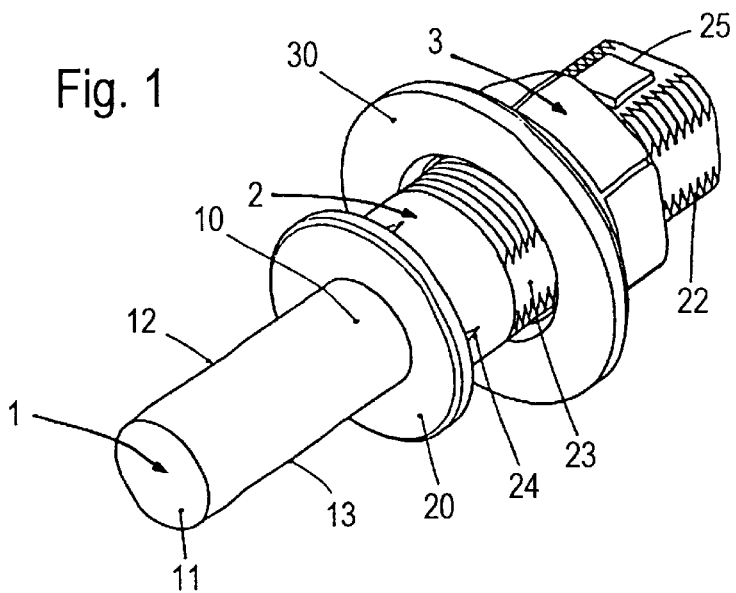

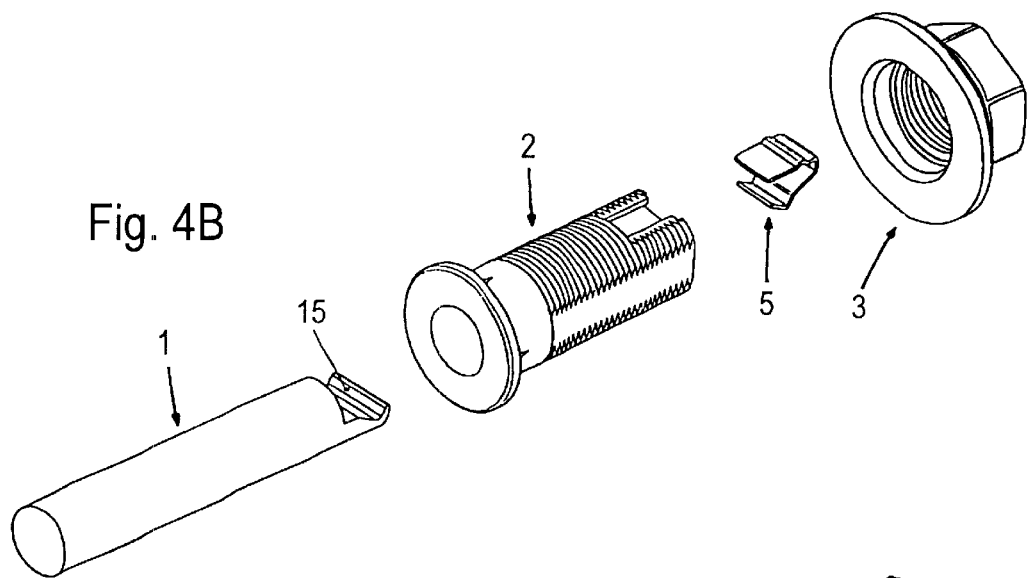
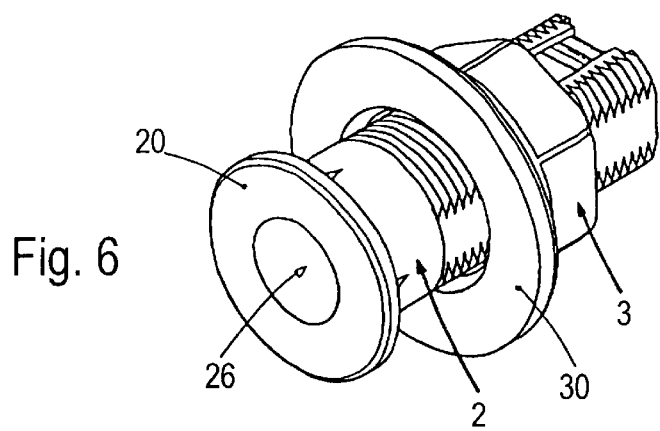
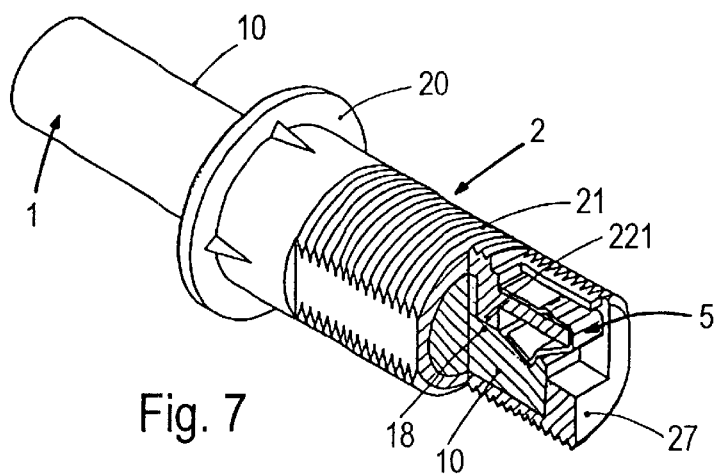

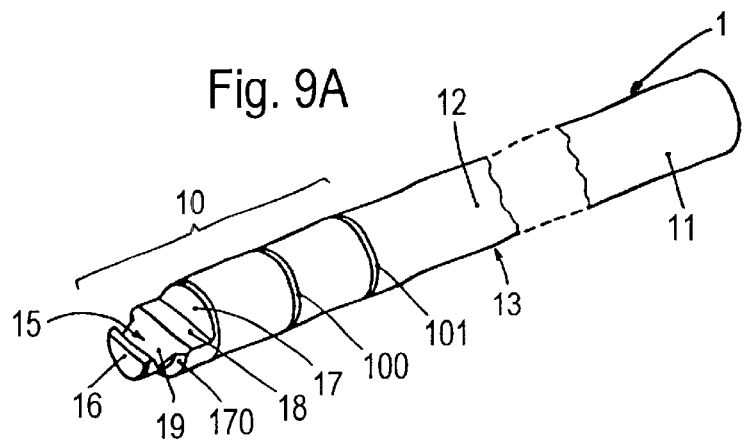
Fig. 9A
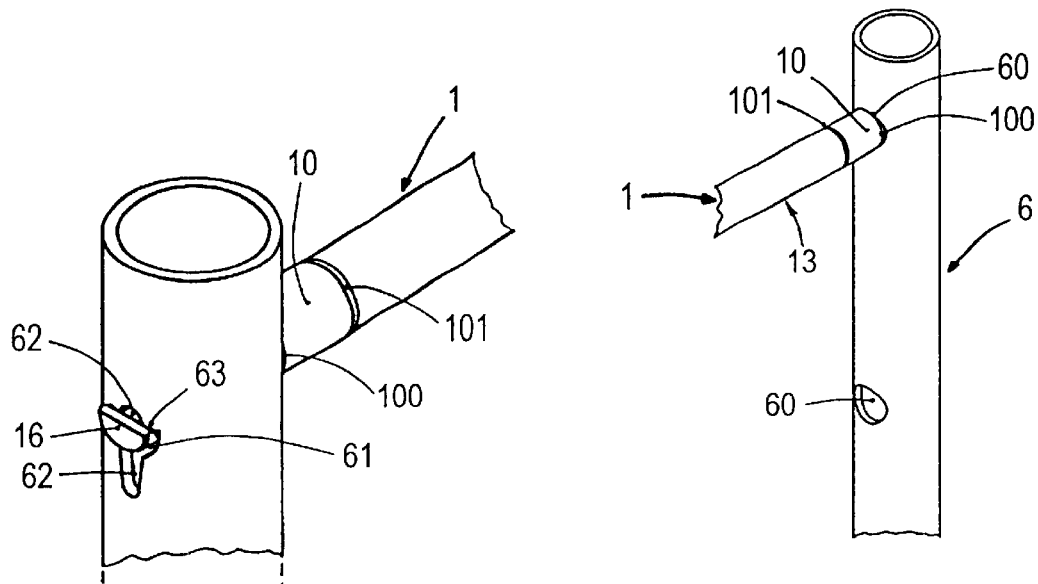
Fig. 9B
Fig. 9C
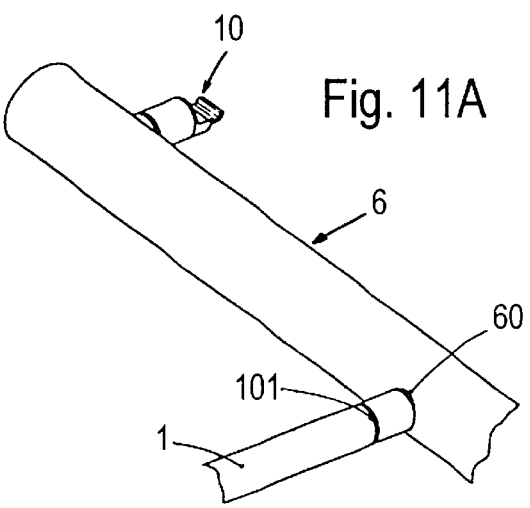
Fig. 11A

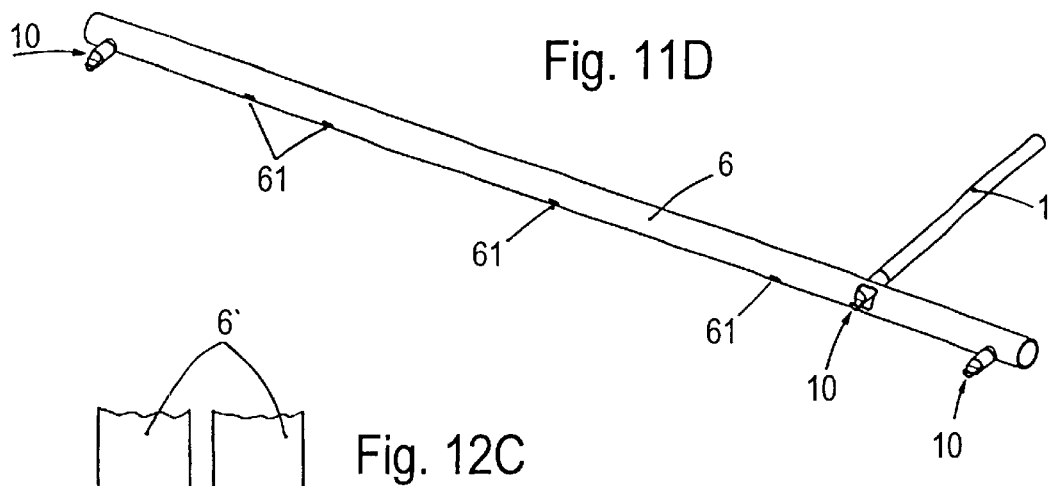
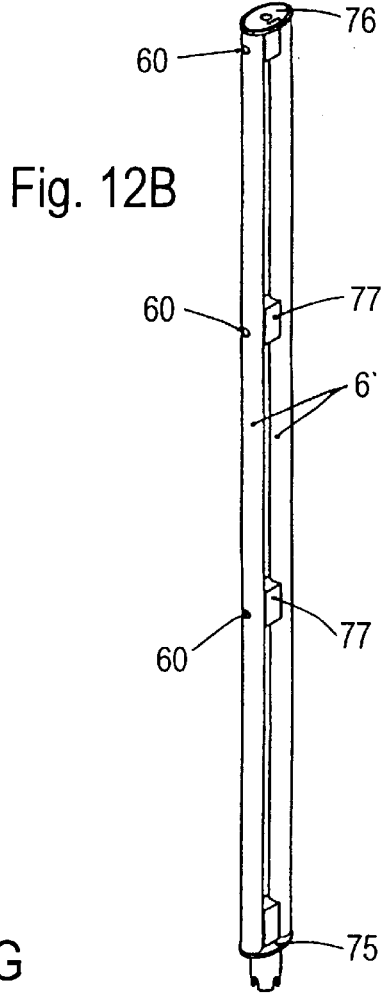
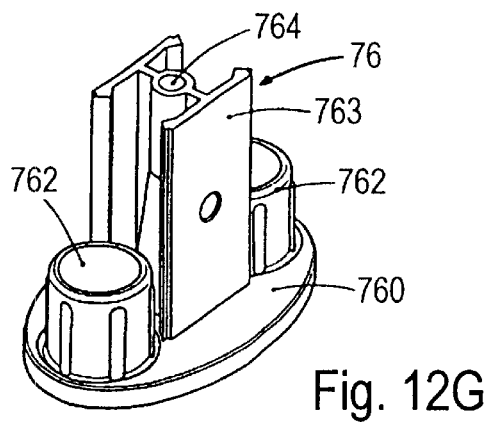

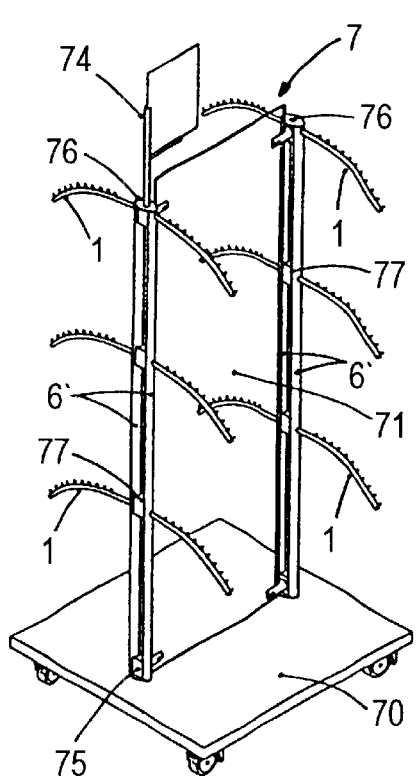
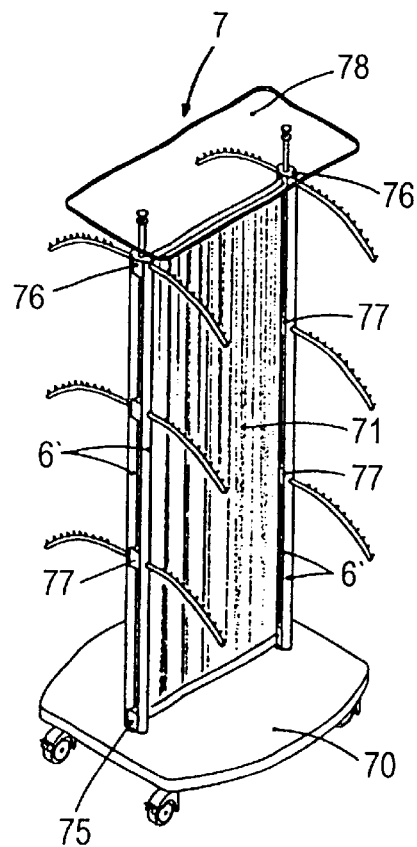
Fig. 13A   Fig. 13B
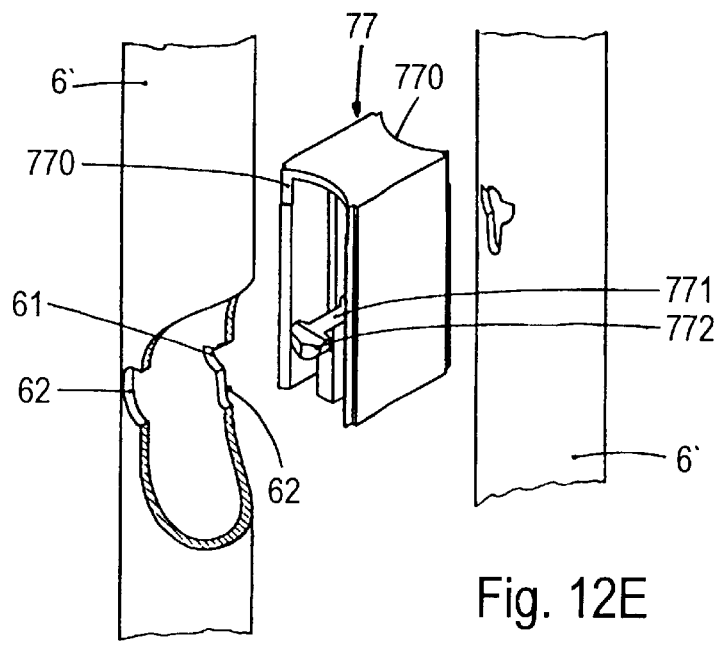
Fig. 12E

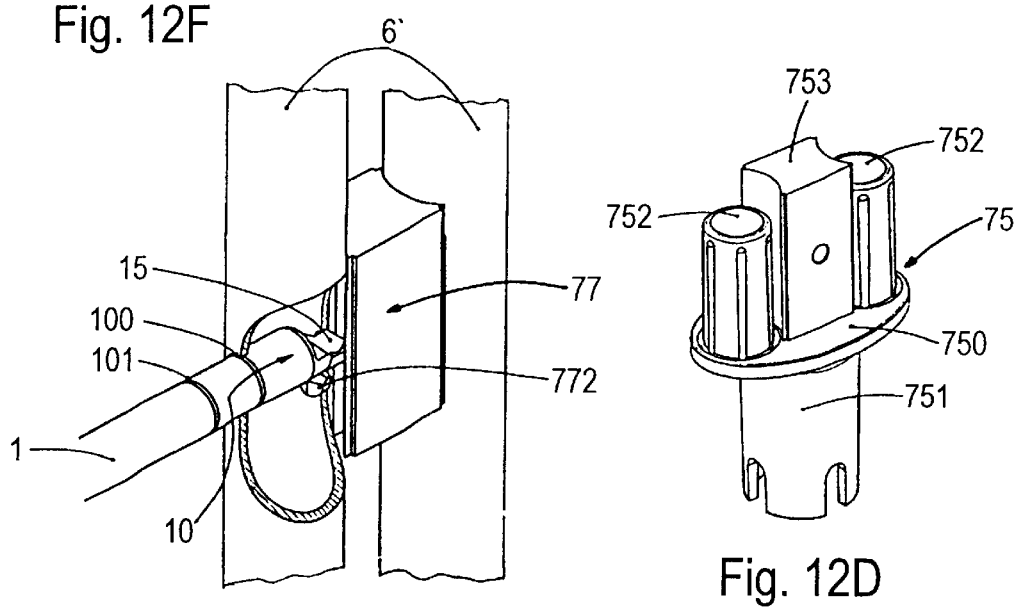
Fig. 12F
Fig. 12D
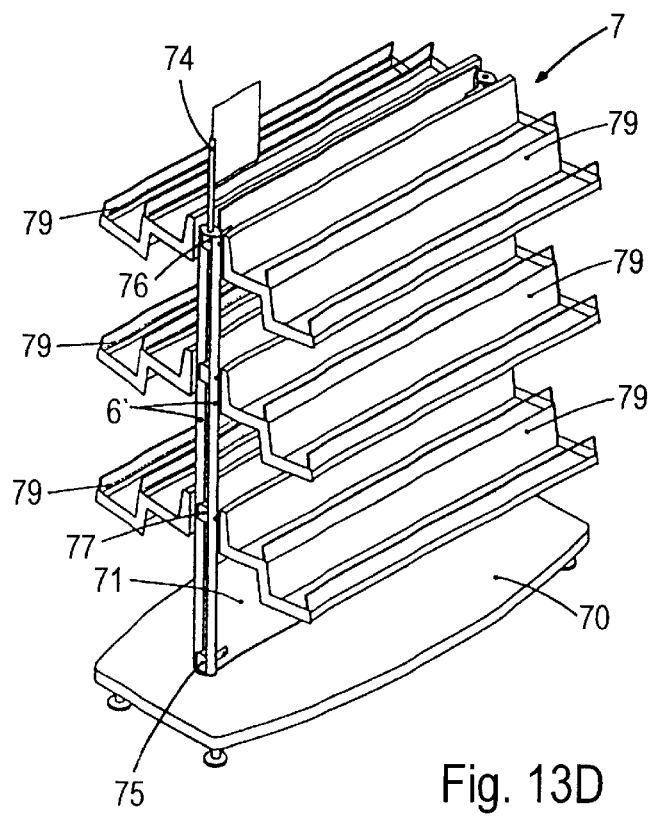
Fig. 13D

SYSTEM OF SUPPORTING BARS FOR USE IN GOODS AND SERVICES ESTABLISHMENTS

TECHNICAL FIELD

The invention relates to a supporting-bar arrangement having a support bar which can be plugged securely into a supporting structure with or without a plug-in sleeve arranged therein. Possible supporting structures are, in particular, panels, rear walls and supports. Such supporting-bar arrangements are typically used in shops and exhibitions for displaying goods or services, However, the supporting-bar arrangements can also be used for fastening decoration or screening elements and as a mount for information carriers. The articles which are being carried, such as items of clothing, accessories and packed goods, may be hung directly on the support bar or else the support bar forms the bracket for the actual carrier, e.g. a goods rack provided on one or more support bars. Thus, such support bars may be, for example, clothes rails or hangers with one or more arms. It Is possible for the support bars to support shelves, secure information or decoration elements and also retain, for example, curtains.

PRIOR ART

For shop fittings and those for trade-fair stands in particular, high variability and design aesthetics, but also a cost-effective solution, are desirable nowadays for supporting-bar arrangements. Such a supporting bar arrangement is disclosed in WO 96/18329. The plug-in sleeves are inserted into a rear wall individually or in a systematically distributed manner. The supporting-bar arrangement comprises a plug-in receiving means and a support bar which can be straightforwardly plugged into the plug-receiving means and disengaged from the same. It is possible for the plug-in receiving means to be positioned on the front side or rear side of a display wall or to be inserted into a wall. Provision is likewise made for the plug-in receiving means to be positioned in or on a rack element. The support bar has a plug-in plate and a tube element attached thereto. In the angled states, the plug-in plate can be introduced into the housing through the window-like plug-in opening and, following slight displacement, arrested behind buffer edges. The tube element itself serves for hanging goods, or a goods carrier is secured thereon. It is also possible for a goods carrier to be seated on the tube elements of a plurality of adjacent support bars or for a plurality of tube elements to be connected by means of crossbars. Systematically distributed plug-in receiving means are provided for this purpose. Said supporting-bar arrangement has proven very successful. However, it is designed predominantly for plug-in receiving means of square configuration and requires a plug-in plate at the front of the support bar. The design principle necessitates a certain minimum size of the components and a certain freedom of movement is required as a result of the tilting of the support bar during engagement and disengagement.

A further tried and tested supporting-bar arrangement is proposed in WO 97/26809. This arrangement likewise comprises a plug-in receiving means into which a support bar can be straightforwardly plugged. It is also possible for this type of plug-in receiving means, of predominantly round configuration, to be inserted directly into a rear wall or into a panel. Provision on the rear sides of the panel or insertion or positioning on a rack element is also possible. The tubular support bar has a latching mechanism which is arranged in its plug-in end and has an actuable lever element which has a movable pawl. In the plugged-together state, said pawl engages, for arresting purposes, in an engagement contour provided in the plug-in receiving means. In this case, there is no need for any plug-in plate at the front of the support bar. The plug-in receiving means has a relatively straightforward inner contour and may thus be produced cost-effectively. However, the latching mechanism arranged in the plug-in end increases the design outlay and necessitates a corresponding cavity in the plug-in end, with the result that the components have to be of a certain dimension.

OBJECT OF THE INVENTION

In summary, it should be stated that the prior range of known supporting-bar arrangements—comprising a plug-in receiving means and a support bar with a plug-in plate seated at the plug-in end or with an internal latching mechanism— still do not satisfy all the various requirements. The problem on which the invention is based is thus to propose a different type of supporting-bar arrangement, of which the support bar requires neither a plug-in plate nor an internal latching mechanism at the plug-in end; rather, it is solely the shaping at the plug-in end which fixes the support bar reliably, on a temporary basis, in the complementary plug-in sleeve, but such that it can also be removed again without difficulty, with the result that an area with numerous plug-in sleeves is straightforward to change round. In particular, the aim is also to make smaller dimensions of the components possible.

The associated plug-in sleeve must, in turn, be capable of being installed easily on a rear wall, a panel or on a rack element. The intention is for the inner configuration of the plug-in sleeve, for fixing the plugged-in support bar, to have a straightforward configuration and thus not to be cost-intensive or to render the supporting-bar arrangement prone to faults. However, the support bars have to be seated reliably in the plug-in receiving means and appear to be aligned precisely along a line without any great outlay in terms of installation. The intention is for a plurality of support bars to be capable of being combined or provided with goods racks, such as shelves or open boxes.

Furthermore, it is also intended to be possible for the support bar, which is used in conjunction with the plug-in receiving means, also to be capable of being plugged with arresting action directly into a hollow support. It is also necessary for support bars which are plugged in directly in this way to be capable of being installed, exchanged and removed easily and quickly. It is necessary for the plugged-in support bars to have a sufficient load-bearing capacity and also to be arrested reliably for a lot of activity taking place round about. A large number of possible variations and combinations and a design which satisfies shop-construction requirements are desirable. Finally, the intention is for the supporting-bar arrangements to be capable of being mass-produced at efficient cost.

SUMMARY OF THE INVENTION

The supporting-bar arrangement comprises a plug-in sleeve, which is accommodated in a through-passage by a supporting structure, and a support bar, which can be plugged into said plug-in sleeve, or the support bar which can be plugged directly into a hollow profile, the plug-in sleeve is of capsule-like form and can be fixed in a wall, in a panel or in a rack element. Provided at the plug-in end of the support bar is a hook contour which serves for fixing in the plug-in sleeve.

In a first embodiment, there is arranged in the plug-in sleeve, in the plug-in opening, a cut-out step behind which the hook contour engages once the support bar has been plugged in. As the support bar is plugged in, the latter first of all has to be angled, in order for the hook contour to pass behind the step, whereupon the support bar can be lowered into the horizontal, and the hook contour engages behind the step to the maximum extent.

In a second embodiment, there is arranged in the plug-in sleeve a spring element which projects into the plug-in opening and latches into the hook contour as the support bar is pushed in. The plug-in sleeve preferably has a positioning flange at the front, while a threaded section is provided at the rear. The plug-in sleeve is usually inserted into a bore in a panel, with the result that the positioning flange can be supported on the front side of the panel, on the border of the bore. On the rear side of the panel, a lock nut is screwed to the projecting threaded section. In both variants, it is advantageous for the plug-in opening in the plug-in sleeve to be provided with a minimal upward sloping relation to the horizontal, with the result that the plugged-in support bars are plugged in the plug-in sleeves with a slight inclination and the adverse visual impression of the support bars hanging down askew is avoided in each case.

In the third embodiment, there is provided in a hollow tube an inlet opening and an outlet opening, which are aligned with one another and are preferably located on the diameter of the tube. The inlet opening is a hole, with the result that the support bar can be plugged in, and the rear end can be raised with play and lowered into the horizontal. The outlet opening is basically shaped as a semicircle with the rounding toward the bottom, in which the hook contour of the plug-in end comes to rest, the hollow-profile wall located at the top border of the outlet opening engaging, in the arrested state, in the indent on the hook contour.

The invention, then, makes available a further type of supporting-bar arrangement where the support bar has a plug-in of very straightforward configuration and is nevertheless fixed reliably in the plug-in sleeve, or directly in a hollow profile, but can also be changed over straightforwardly. The latching connection produced between the plugged-in support bar and the plug-in sleeve or the hollow profile, then, makes it possible to produce the components in smaller dimensions, which is advantageous in design terms for certain applications. By virtue of the design, laborious adjustment of individual plug-in receiving means within a multiplicity thereof is dispensed with. With correct production and installation, the inserted support bars are aligned precisely of their own accord and thus also provide a solid appearance on the display wall, within the rack or on the relevant fitting. The supporting-bar arrangement can be used in a very varied manner as an actual goods carrier and for securing goods carriers.

BRIEF DESCRIPTION OF THE ATTACHED DRAWINGS

Figure 2A:
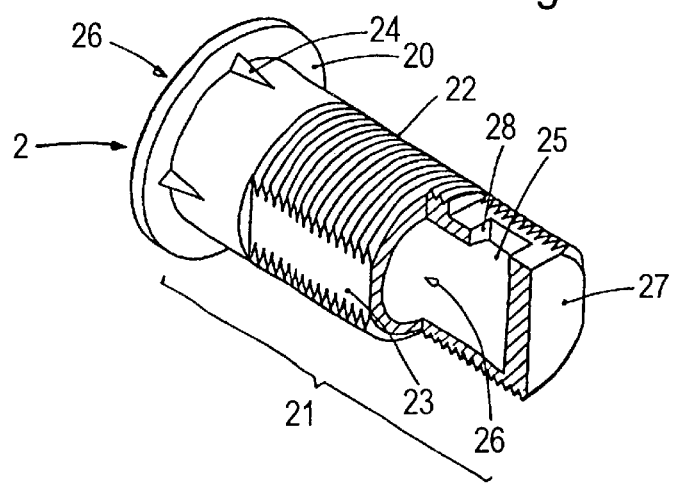
Figure 2B:
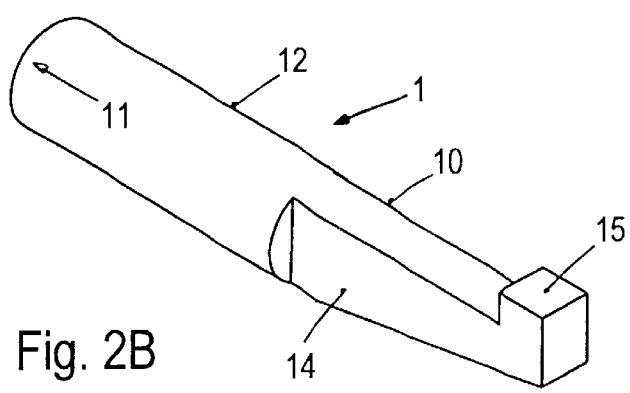
Figure 3A:
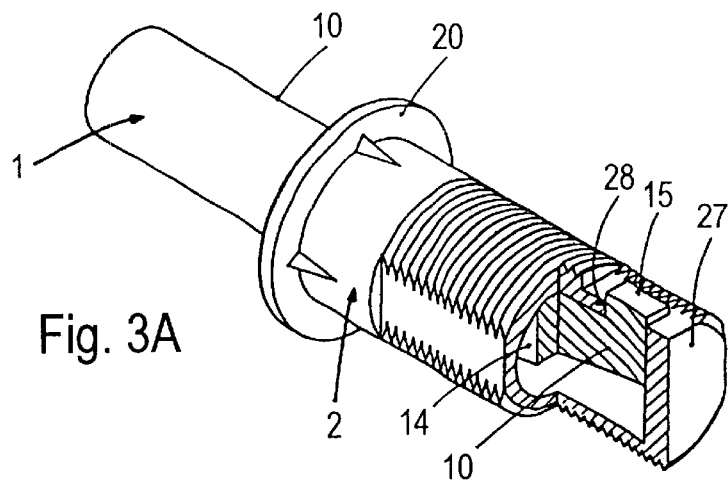
Figure 3B:
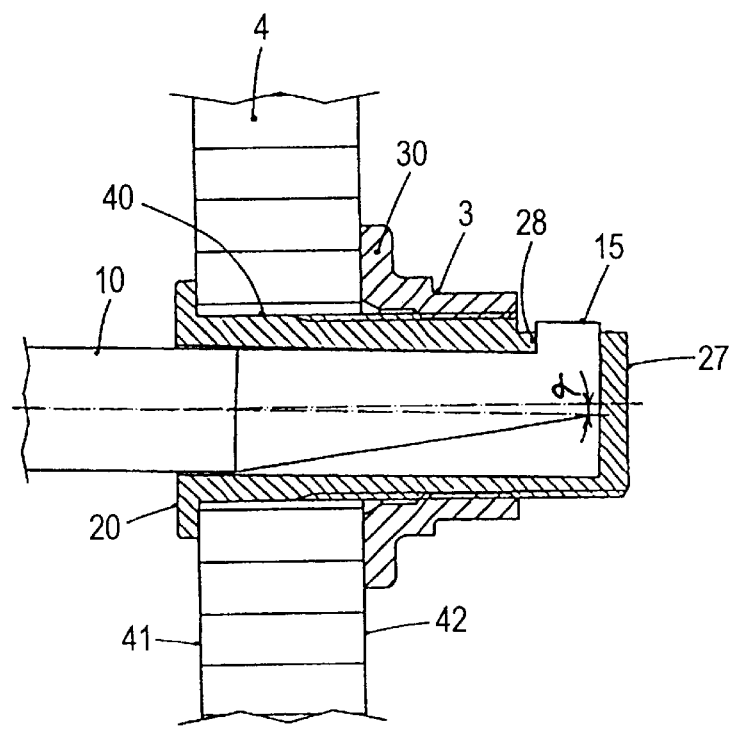
Figure 5A:
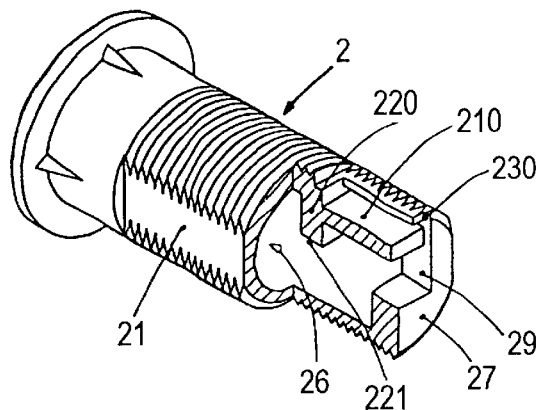
Figure 4A:
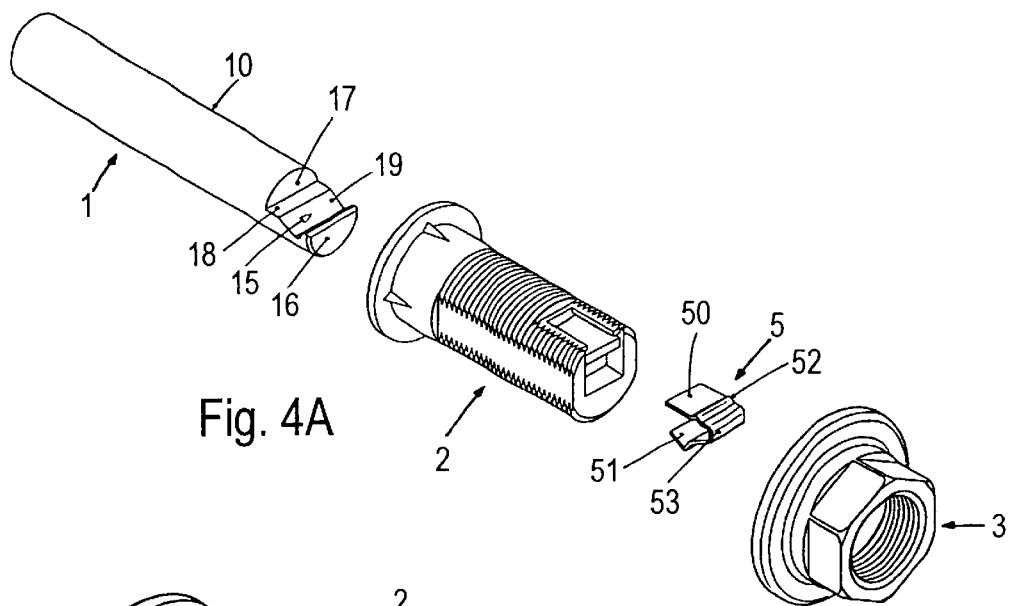
Figure 5B:
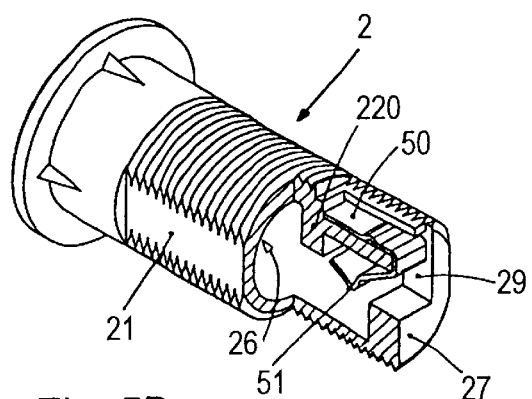
Figure 8A:
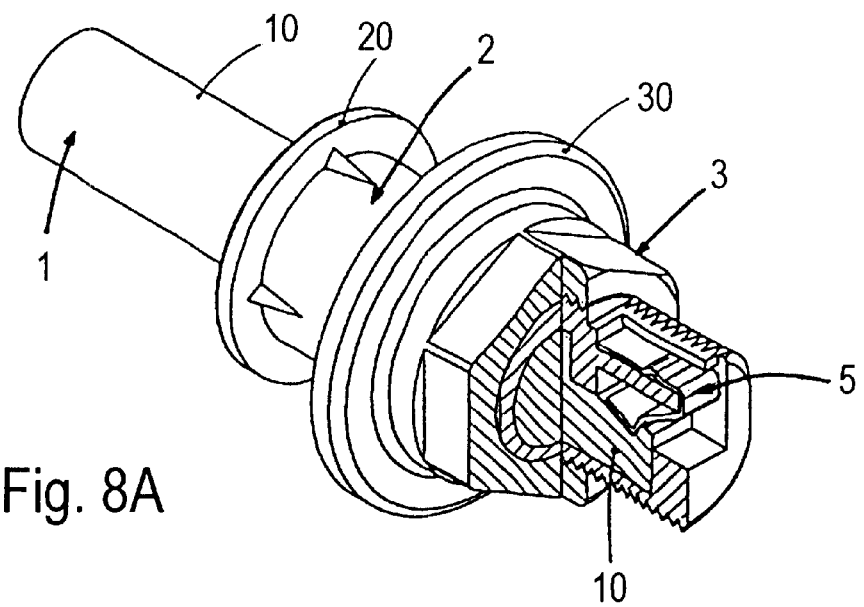
Figure 8B:
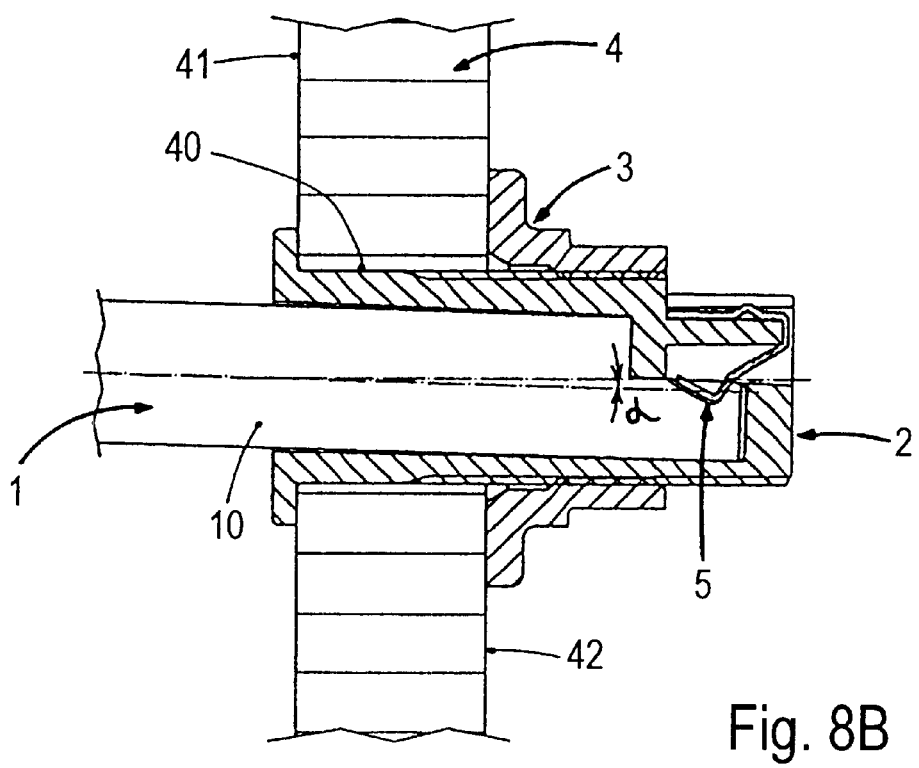
Figure 10:
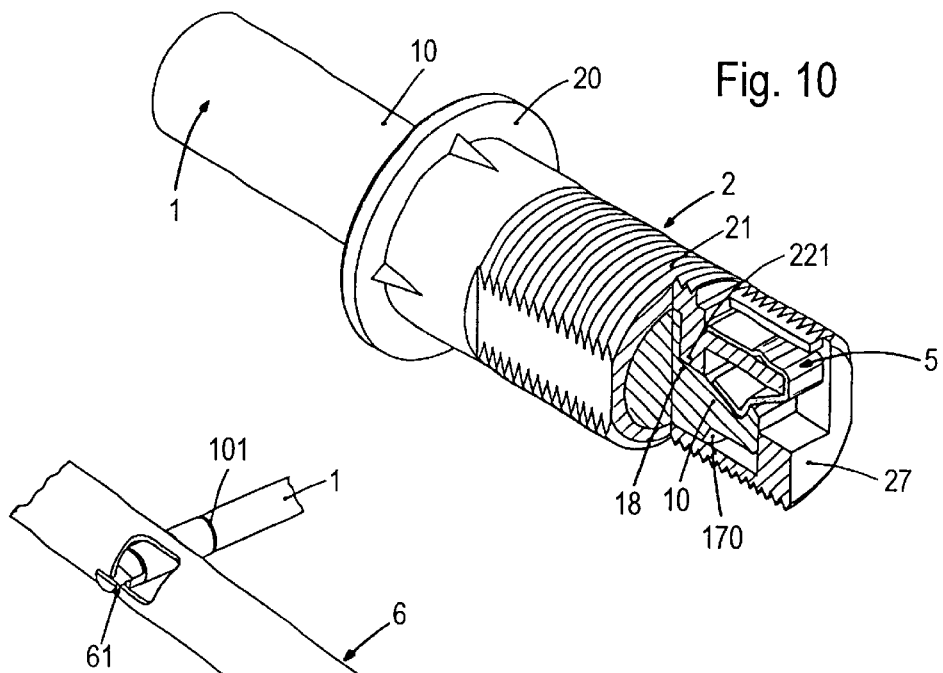
Figure 11B:
Figure 11C:
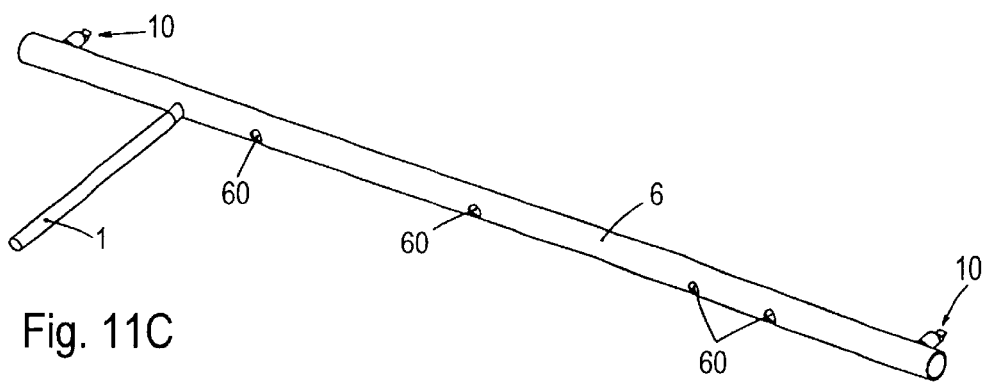
Figure 12A:
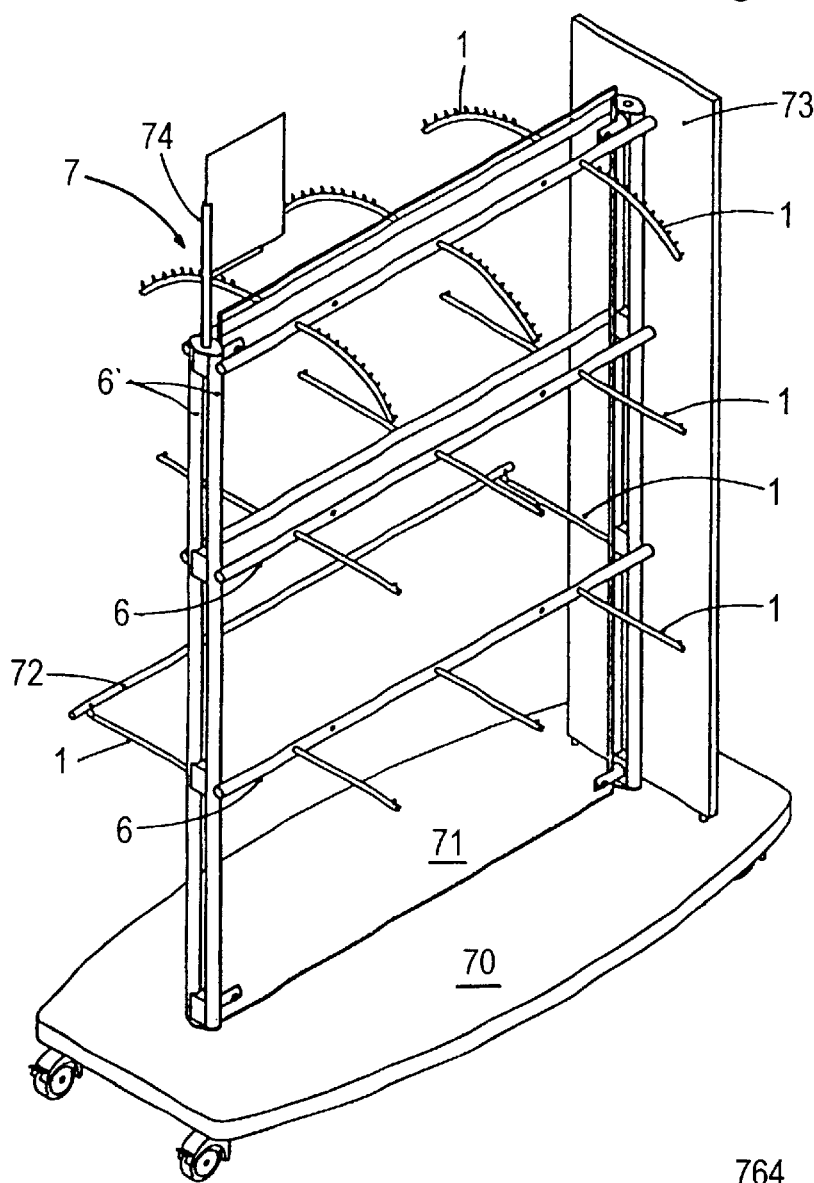
Figure 12H:
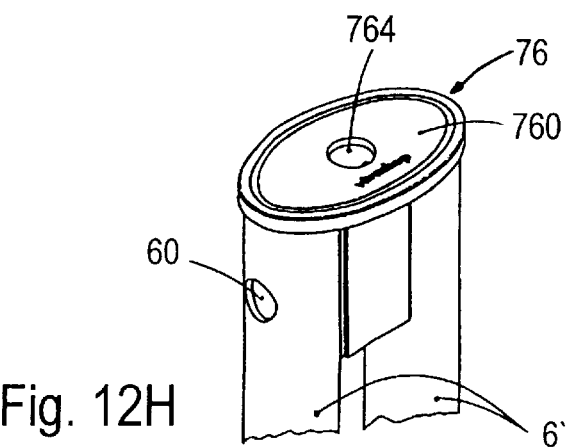
Figure 13C:
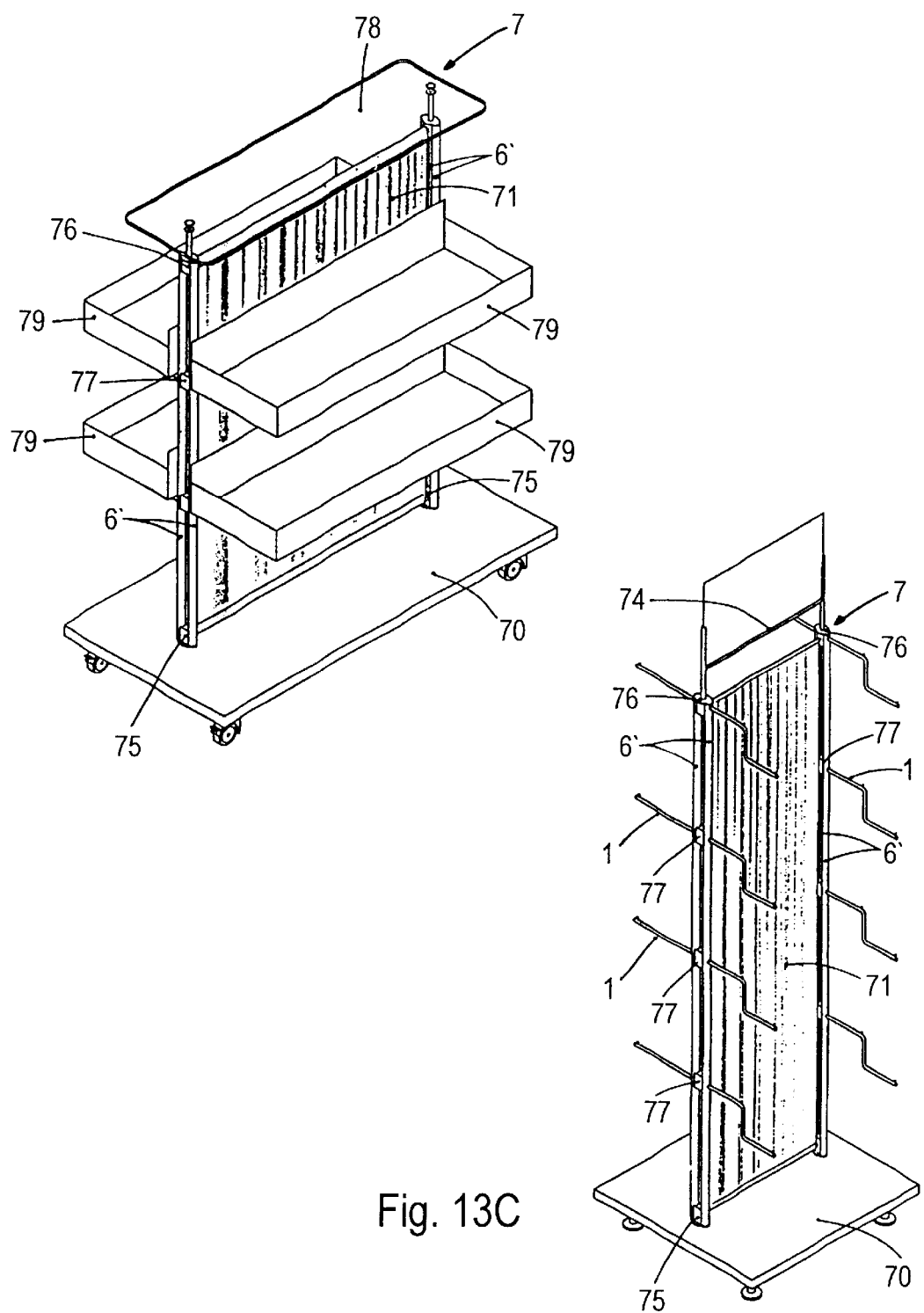

FIG. 1: shows a first exemplary embodiment of a plugged-together supporting-bar arrangement with the plug-in end of the support bar, the plug-in sleeve, the screwed-on nut and with a cut-out step in the plug-in opening of the plug-in sleeve;

FIG. 2A: shows the plug-in sleeve according to FIG. 1, partly in section;

FIG. 2B: shows the plug-in end of the support bar according to FIG. 1;

FIG. 3A: shows the plug-in sleeve with introduced support bar according to FIG. 1, partly in section;

FIG. 3B: shows the supporting-bar arrangement according to FIG. 1 in a panel, partly in section;

FIG. 4A: shows an exploded illustration of a second exemplary embodiment of a supporting-bar arrangement with the plug-in end of the support bar, the plug-in sleeve, the spring element and the nut;

FIG. 4B: shows the supporting-bar arrangement according to FIG. 4A in a different perspective;

FIG. 5A: shows the plug-in sleeve according to FIG. 4A, partly in section;

FIG. 5B: shows the plug-in sleeve according to FIG. 4A with inserted element, partly in section;

FIG. 6: shows the plug-in sleeve with screwed-on nut according to FIG. 4A;

FIG. 7: shows the plugged-together supporting-bar arrangement with the plug-in end of the support bar, the plug-in sleeve and the inserted spring element according to FIG. 4A, partly in section;

FIG. 8A: shows the illustration according to FIG. 7 with screwed-on nut;

FIG. 8B: shows the supporting-bar arrangement according to FIG. 4A in a panel, partly in section;

FIG. 9A: shows a third embodiment of the plug-in end of the support bar;

FIG. 9B: shows a front view of part of a vertical support with plugged-in plug-in end of the support bar according to FIG. 9A;

FIG. 9C: shows an enlarged rear view of the illustration according to FIG. 9B;

FIG. 10: shows the plugged-together supporting-bar arrangement with the plug-in end of the support bar of the third exemplary embodiment according to FIG. 7, the plug-in sleeve and the inserted spring element, partly in section;

FIG. 11A: shows a front view of part of a horizontal support with plugged-in and projecting plug-in end of the support bar according to FIG. 9A;

FIG. 11B: shows a rear view of the illustration according to FIG. 11A;

FIG. 11C: shows the illustration according to FIG. 11A with the entire horizontal support;

FIG. 11D: shows a rear view of the illustration according to FIG. 11C;

FIG. 12A: shows a mobile stand with vertical framework tubes, crossbars fitted horizontally therein and support bars plugged therein;

FIG. 12B: shows a pair of framework tubes with the base part, the termination part and tube connectors;

FIG. 12C: shows, on an enlarged scale, the bottom section of the framework tubes with the base part according to FIG. 12B;

FIG. 12D: shows the base part from FIG. 12B;

FIG. 12E: shows a tube connector from FIG. 12B with two framework tube parts in close proximity to one another, partly in section;

FIG. 12F: shows the illustration according to FIG. 12E in the connected state with plugged-in plug-in end of a support bar according to FIG. 9A;

FIG. 12G: shows the view from beneath of the termination part from FIG. 12B;

FIG. 12H: shows, on an enlarged scale, the top section of the framework tubes according to FIG. 12B with the termination part according to FIG. 12G;

FIG. 13A: shows a stand with pairs of vertical framework tubes, support bars plugged therein, a partition wall and a bill placed in position;

FIG. 13B: shows the stand according to FIG. 13A with canopy placed in position;

FIG. 13C: shows the stand according to FIG. 13A with a bill spanning it;

FIG. 13D: shows the stand according to FIG. 13A with fitted-in stepped trays and a bill placed in position; and FIG. 13E: shows the stand according to FIG. 13A with fitted-in trays and canopy placed in position.

EXEMPLARY EMBODIMENTS

The detailed description of exemplary embodiments of the supporting-bar arrangement according to the invention are given hereinbelow. FIGS. 1 to 3B relate to the first exemplary embodiment, FIGS. 4A to 8B concern second exemplary embodiment, and FIGS. 9A to 13E contain a third exemplary embodiment FIG. 10 constitutes a crossover between the second and third exemplary embodiments. Possible modifications are mentioned following the description.

The following applies to the rest of the description. If, in order to avoid ambiguity in the drawings, a figure contains designations which are not explained in the directly associated text of the description, then you are referred to the point at which they are mentioned in previous or following descriptions of the figures. For reasons of clarity, components are not usually designated again in subsequent figures, provided that it is clear from the drawings that they are "recurring" components.

FIG. 1

The supporting-bar arrangement includes first of all a support bar 1, in this case made of round material. The support bar 1 has, on one side, a front plug-in end 10 and, opposite the latter, a bar end 11. Furthermore, the support bar 1 has the top side 12 and the underside 13 of the bar defined on it. The plug-in end 10 is intended for plugging into the plug-in sleeve 2. The bar end 11 may be of elongate, bent or angled design for hanging articles directly, The bar end 11 may also bear a goods rack or, in principle, merely integrally into a goods rack, e.g. a shoe support.

The plug in sleeve 2 has, on the front side, a positioning flange 20, the sleeve part 21 adjoining behind this, said sleeve part having an external thread 22 and two parallel flattened surfaces 23. Radial securing protrusions 24 are provided at the transition from the positioning flange 20 to the sleeve part 21. In the vicinity of the rear, free end of the sleeve part 21, there is a step through-passage 25. The top end of the hook contour of the plugged-in support bar 1 projects through the step through passage 25. The securing protrusions 24 serve for securing against rotation the plug-in sleeve 2 inserted, for example, into a through-passage bore in a wooden panel. The flattened surfaces 23 make it possible, during installation, to attach a socket wrench if the nut 3, which is shown in the screwed-on state, is tightened against the rear wall of the panel. Parallel to the positioning flange 20 on the plug-in sleeve 2, the nut 3 has a counterflange 30 which is directed toward the positioning flange 20 and is intended for positioning on the rear wall of the panel.

FIG. 2A

Inside it, the plug-in sleeve 2 has an axial inlet opening 26, which serves for receiving the plug-in end 10 of the support bar 1. In order to limit the plug-in depth, the plug-in sleeve 2 has the sleeve base 27, against which a plugged-in support bar 1 strikes. The through-passage 25 is located on the top side of the sleeve part 21, in the vicinity of the sleeve base 27, with the result that a step 28 oriented in the direction of the positioning flange 20 is produced. Along the axial inlet opening 26, preferably adjacent to the sleeve base 27, a non-rotationally-symmetrical section is provided in order to secure the plugged-in support bar 1 additionally against rotation.

FIGS. 2B and 3A

The plug-in end 10 of the support bar 1, which in this case consists of round material, has two lateral flattened formations 14 and, at the end, a hook contour 15 in the form of an upright nose rising up to the top side 12 of the bar, possibly projecting beyond the same. Once the plug-in end 10 has been plugged into the axial inlet opening 26 of the plug-in sleeve 2 to the full extend then the hook contour 15 projects through the step through-passage 25 and engages behind the step 28. The flattened formations 14 are positioned within a complementary section in the axial inlet opening 26. The support bar 1 is then thus secured both against being drawn out axially and against rotation.

In order to introduce the plug-in end 10 of the support bar 1 into the axial inlet opening 26 of the plug-in sleeve 2, the support bar 1 has to be kept inclined in relation to the horizontal, with the result that the bar end 11 is raised, in such a position, the hook contour 15 can be guided behind the step 28; there is free space in the axial inlet opening 26 for this purpose. The support bar 1 is then pivoted into the horizontal position, as a result of which the hook contour 15 rises up and then engages behind the step 28 to the maximum extent. The procedure for removing a support bar 1 located in the plug-in sleeve 2 takes place in reverse order.

FIG. 3B

In order to insert a plug-in sleeve 2 into a panel 4, a through-passage 40 has to be produced in the panel 4 beforehand. The plug-in sleeve 2 inserted into the through-passage 40 is seated with its positioning flange 20 on the front side 41 of the panel 4. The nut 3 is screwed onto the external thread 22 on the sleeve part 21, which projects through the through-passage 40, from the rear side 42 of the panel 4, with the result that the counterflange 30 rests on the rear side 42 of the panel. In order to align the plugged-in support bar 1 in a visually advantageous manner, the axial inlet opening 26 in the plug-sleeve 2 slopes up slightly at the angle $\alpha > 0°$ from the sleeve base 27 to the positioning flange 20. The upwardly oriented hook contour 15 on the support bar 1 and the step 28 in the plug-in sleeve 2 are aids for correctly positioned installation and provide clear orientation as the support bar 1 is plugged in.

FIGS. 4A, 4B and 6

In the second exemplary embodiment of the supporting-bar arrangement, the support bar 1, the plug-in sleeve 2 and the nut 3 are likewise provided. The differences reside in the manner of fixing the plugged-in support bar 1 in the plug-in sleeve 2. The hook contour 15 at the plug-in end 10 of the support bar 1 is designed differently. Furthermore, in this case, rather than the hook contour 15 engaging behind a step 28 on the sleeve part 21, there is an additional spring element 5, which is provided on the plug-in sleeve 2 and is intended for engaging in the hook contour 15.

If, in the first exemplary embodiment, the hook contour 15 of the support bar 1 rises up at least to the top side 12 of the bar, or projects beyond the same, then the hook contour 15 here is produced by a material recess. At the plug-in end 10, over a latching section between the end surface 16 and a vertical stop 17, from the top side 12 of the bar, the material is recessed approximately to half the bar thickness, to the level of a horizontal transverse ledge 18. Provided in the vicinity of the end surface 16, from said ledge 18, is a V-shaped transverse indent 19, of which the base is oriented toward the underside 13 of the bar. This transverse indent 19 forms the hook contour 15, which is designed to be steeper toward the end surface 16 than toward the vertical stop 17. The edge-like transition from the end surface 16 to the transverse indent 19 is rounded.

The hook contour 15 shaped geometrically in this way may advantageously be produced by injecting molding plastic and by machining metal. In this exemplary embodiment, the lateral flattened formations 14 at the plug-in end 10, and the complementary shaping in the axial inlet opening 26 of the plug-in sleeve 2, are also rendered superfluous. The spring element 5 is a leaf spring which is bent, in principle, in the form of a U and has a horizontally extending flat part 50 at the top end a V-shaped bottom end 51, The flat part 50 merges into the bent part 53 by way of a transverse convexity 52.

FIGS. 5A and 5B

Provided in the top region of the sleeve base 27 is a sleeve through-passage 29 toward which there is oriented axially a tongue part 210, which extends out of the interior of the sleeve part 21 and is attached there to a semicircular inner stop 220 parallel to the sleeve base 27. The inner stop 220 terminates at the bottom with a horizontal shoulder 221. The sleeve part 21 is recessed above the tongue part 210, although axial, mutually parallel grooves 230 remain above the tongue part 210, on both sides of the same. The grooves 230 are provided for receiving the side flanks of the flat part 50 of the push-in spring element 5, the transverse convexity 52 causing a clamping action in the grooves 230. The bent part 53 of the spring element 5 wraps around the tongue part 210, with the result that the bottom end 51 of the spring element 5 projects into the axial inlet opening 26 by way of the sleeve through-passage 29.

FIG. 7

If the support bar 1 has been pushed into the axial inlet opening 26 of the plug-in sleeve 2, by way of the plug-in end 10, to the full extent, then the end surface 16 and/or the vertical stop 17 butt against the inside of the sleeve base 27 and/or against the inner stop 220 in the plug-in sleeve 2. As the plug-in end 10 is introduced, the hook contour 15 pushes past the V-shaped bottom end 51 of the spring element 5 until the latter latches into the transverse indent 19. The support bar 1 is thus secured in the plug-in sleeve against being drawn out accidentally and against rotation. If it is desired to remove the support bar 1 again, the support bar 1 has to be pulled with sufficient force to overcome the stressing of the spring element 5, i.e. the V-shaped bottom end 51 of the latter bends upward and clears the hook contour 15. The support bar 1 plugged into the plug-in sleeve 2 is then secured against rotation by the horizontal transverse ledge 18 and the horizontal shoulder 221, which come into abutment with one another.

FIGS. 8A and 8B

As in the first exemplary embodiment, it is also possible here for the nut 3 to be screwed onto the external thread 22 on the sleeve part 21 of the plug-in sleeve 2, in order to secure a plug-in sleeve 2 inserted in a through-passage 40 in the panel 4. The positioning flange 20 of the plug-in sleeve 2 rests on the front side 41 of the panel 4, while the counterflange 30 of the nut 3 presses onto the rear side 42 of the panel. Here too, the axial inlet opening 26 in the plug-in sleeve 2 may be provided with a slight upward slope α>0° from the sleeve base 27 to the positioning flange 20.

FIG. 9A

The essential difference of the supporting-bar arrangement of the third exemplary embodiment is that, rather than requiring a plug-in sleeve 2, the contoured plug-in end 10 of the support bar 1 can be plugged directly into a hollow profile. Possible hollow profiles are, in particular, round and square tubes. The plug-in end 10 has, in turn, the hook contour 15, the front end surface 16, the stop 17, the ledge 18 and the indent 19. The contours 15–19 are produced, for example, by material being removed from the top side 12 of the bar. In order to limit the plug-in depth, the plug-in end 10 is tapered in cross section on the underside 13 of the bar from the end surface 16 to the transition between the hook contour 15 and the ledge 18, with the result that a stop shoulder 170 in the form of half an arc is produced. Located behind the stop 17, in the direction of the support bar 1, are two spaced-apart, radially encircling marking grooves 100, 101 as a measure of the plug-in depth.

FIGS. 9B and 9C

The support bar 1 can be plugged into a tube 6—in this case into a vertical support—by way of the plug-in end 10 provided with the hook contour 15. In order for the plug-in end 10 to be plugged in, the tube 6 is provided with through-openings, namely inlet openings 60 and outlet openings 61 aligned therewith, which are preferably located on the diameter of the tube 6. The inlet opening 60 is a hole through which the supporting bar 1 can be plugged, the size of the inlet opening 60 allowing the rear bar end 11 to be raised—as a result of which the support bar 1 passes into an oblique position—and to be lowered into the horizontal. The outlet opening 61 is in the basic shape of a semicircle with the rounding in the downward direction. If it is desired for the outlet opening 61 to be utilized at the same time for latching a tube connector therein (see FIGS. 12E and 12F), the outlet opening 61 passes through a vertical, central notch 62 which is narrower than the outlet opening 61 and widens the latter in the upward and downward directions. The notch 62 narrows downward and, in the upward direction, the outlet opening 61 is bounded by the wall border 63 of the tube 6.

In the plugged-in, rest state, the dead weight of the support bar 1 alone presses the indent 16 of the hook contour 15 against the wall border 63. The underside 13 of the bar is supported on the bottom border of the inlet opening 60. In the outlet opening 61, beneath the plug-in end 10, there is an air gap which allows the bar end 11 to be raised, this accompanying the action of lowering the plug-in end 10. As the plug-in end 10 is plugged through the inlet and outlet openings 60,61, the stop shoulder 170 strikes, inside the tube 6, against the tube wall, with the result that it is not possible for the support bar 1 to be plugged in to any greater extent. The correct plug-in depth is detected, moreover, by the position of the marking grooves 100,101, which are arranged in accordance with the different tube diameters used. With a smaller tube diameter, the front marking groove 100 has to be located in front of the inlet opening 61 and, with a larger tube diameter, the rear marking groove 101 has to be positioned thus. Inlet and outlet openings 60,61 provided systematically in a unit-spacing arrangement allow support bars 1 to be plugged in at different selectable positions.

FIG. 10

For the illustration here, on account of it being largely identical to FIG. 7, you are referred to FIG. 7. The only difference is that the plug-in end 10 is provided additionally with the stop shoulder 170. In conjunction with a plug-in sleeve 2, however, the stop shoulder 170 does not have any function. A support bar 1 with stop shoulder 170 can be used both for plugging into the tube 6 and for plugging into a plug-in sleeve 2.

FIGS. 11A to 11D

It is equally possible for the support bar 1 to be plugged into a horizontally arranged tube—in this case a crossbar 6.

The important factor is for the appropriate inlet and outlet openings 60,61 to be provided in the crossbar 6. In a further configuration of a supporting-bar arrangement, two plug-in ends 10 are fixedly inserted at the outer ends of such a crossbar 6. Said plug-in ends 10 are inserted on that side of the crossbar 6 on which the outlet openings 61 are located. This makes it possible for the entire crossbar 6 with the support bars 1 plugged therein to be fitted into two vertical framework tubes 6' or a horizontal framework tube 6'. In this case, the two fixed plug-in ends 10 of the crossbar 6 engage in inlet and outlet openings 60,61 which are located in the framework tube 6'. Marking grooves 100,101 provided, in turn, at the fixedly inserted plug-in ends 10 indicate the correct insertion depth. A plurality of inlet and outlet openings 60,61 in the crossbar 6 make it possible for the crossbar 6 to be fitted in a variable manner with one or more support bars 1.

FIG. 12A

A complex use of the supporting-bar arrangement as shown in the mobile stand 7. Pairs of connected framework tubes 6' are plugged vertically into a stand panel 70, a partition wall 71 extending between said tubes. Spanning crossbars 6 are fitted into the framework tubes 6' (in a concealed manner) by means of plug-in ends 10 arranged fixedly in the crossbars. The crossbars 6 are fitted with different support bars 1. By way of example, two support bars 1 are plugged directly into the framework tube 6' by way of their plug-in ends 10 (which cannot be seen here), these two support bars 1 being spanned by a horizontal bar 72 fixed thereon. The articles which are to be displayed can be hung on the support bars 1 and the horizontal bar 72. The stand 7 is completed by a decorative wall 73, which is attached in front on a top side of the stand 7, and a bill holder 74, which is plugged onto the framework tubes 6'.

FIGS. 12B, 12C, 12D, 12G and 12H

A pair of mutually parallel framework tubes 6' are held together by a base part 75 at the bottom, by a termination part 76 at the top and a plurality of tube connectors 77 added therebetween. The base part 75 has a base plate 750, from which a conical plug-in extension 751 extends in the downward direction. Provided in the stand panel 70 are depressions which are complementary to the plug-in extension 751 and into which the plug-in extensions 751 can be plugged with self-locking action. Extending upward from the base plate 750 are two outer stubs 752 and a block 753 which is located therebetween and is used for fastening the partition wall 71 and the decorative wall 73. The bottom ends of the framework tubes 6' are plugged with clamping action onto the stubs 752.

The termination part 76 is plugged with clamping action onto the top ends of the framework tubes 6' and has two stubs 762, which are oriented downward from its base plate 760, and a block 763 located therebetween. The top block 763 serves, in turn, for fastening the partition wall and decorative wall 71,73. The vertical plug-in receiving means 764 in the block 763 can be utilized for plugging a bill holder 74 therein or for fastening a canopy (see FIG. 13B). The tube connectors 77 are introduced between the pair of framework tubes 6'. It is possible to see on the framework tubes 6'—in this case level with the introduced tube connectors 77 and the termination part 76, inlet openings 60 into which it is possible to plug plug-in ends 10.

FIGS. 12E and 12F

The block-like tube connector 77 is of concave design, corresponding to the rounding of the framework tubes 6', on its side flanks 770, which are directed toward the two framework tubes 6'. The individual side flank 770 has a cavity from which a fixed catch 771 extends by way of a front, thickened head 772. When a pair of framework tubes 6' are assembled, the tube connector 77 is positioned against a framework tube 6' by way of its side flank 770 and, in this case, the head 772 is plugged through the widened region of the notch 62 at the top, said notch passing through the outlet opening 61 in the tube 6. Thereafter, the tube connector 77 is pressed downward, with result that the head 772 engages behind the tube wall, in the region of the downwardly narrowing notch 62, and releases the outlet opening 61. The cavity on the side flank 770, moreover, provides space for the hook contour 15, projecting out of the outlet opening 61, of a support bar 1 which may be plugged in. If this is done with the two framework tubes 6' at the same time, the two framework tubes 6' are coupled releasably by the tube connector 77.

FIGS. 13A to 13E

The stand 7 shown in FIG. 12A may be modified in many different ways, the use of a supporting-bar arrangement within a stand 7 only being one application example of the third exemplary embodiment. With sufficient thickness of the partition or decorative wall 71,73, it would be possible for the latter to be fitted with plug-in sleeves 2 and thus to provide supporting-bar arrangements of the first and second exemplary embodiments. The differently designed stands 7 have the following components, the mobile stand panel 70 being common to all of these:

- FIG. 13A: A partition wall 71 is introduced between the two pairs of framework tubes 6' and numerous support bars 1—in the form of arcuate hanging arms—are plugged into the framework tubes 6' from both sides. A bill holder 74 is plugged into a termination part 76.

- FIG 13B: A canopy 78 which spans the stand 7 is fastened in the two termination parts 76 and is secured by plug-in bolts introduced into the plug-in receiving means 764.

- FIG. 13C: Instead of the canopy 78, the stand 7 is spanned by a bill holder 74 which is fixed in the plug-in receiving means 764 on both sides. The support bars 1 plugged in on both sides are bent in different ways.

- FIG. 13D: In this case, the goods are not hung on plugged-in support bars 1; rather, goods carriers 79 which are fitted on the framework tubes 6' and are in the form of stepped trays are provided. A bill holder 74 is positioned in a termination part 76.

- FIG. 13E: In contrast to the stepped trays, the actual goods carriers 79 in this case are formed by straightforward trays. The stand 7 is provided, in turn, with a canopy 78.

The following possible modifications to the supporting-bar arrangement which has been described hitherto should be expressly mentioned here:

- The plug-in sleeves 2 on a panel 4 can be distributed effectively, in design terms, over an area and can then be fitted out differently, it also being possible to use support bars 1 which bridge two or more plug-in sleeves 2 and can be plugged in there by way of their plug-in ends 10.

- It is not necessary for the through-passage 25 to be provided in the plug-in sleeve 2; the decisive factor is the presence of an internal step 28 behind which the hook contour 15 can pass. This is also possible by way of an inner cavity in the lateral surface of the free part 21. It would also be possible for the spring element 5 to be inserted inside.

- The support bar 1 may be produced from metal or plastic, depending on the desired appearance and loading values. The plug-in sleeve 2 will preferably be produced as a metallic casting:

The support bar 1 need not be made of round material; bar material with edges may also be used. Rack elements, tube structures or frame parts are also possible supporting structures into which the plug-in sleeve 2 can be inserted.

Instead of screwing in the plug-in sleeve 2, it should also be possible for the latter to be adhesively bonded in the prepared through-passage 40 at the envisaged insertion depth.

For insertion of the plug-in sleeve 2 into glass walls, it is advisable to enlarge the positioning flange 20 and the counterflange 30.

Support bars 1 without the use of a plug-in sleeve 2 can be inserted, in principle, into all tubular or double-walled shop-construction supporting structures provided correspondingly with inlet and outlet openings 60,61. Angle profiles are also possible for this purpose. The important factor is for the plug-in end 10 to be supported at two locations—in the inlet opening and in the outlet opening 60,61. This can take place within a single-walled supporting structure where a curved or angled wall is penetrated at two locations. Also suitable are double-walled supporting structures where the inlet opening 60 is provided in the first wall and the outlet opening 61 is provided in the second wall.

We claim:

1. A supporting-bar arrangement for goods and services establishments for directly hanging articles to be displayed, comprising a support bar having a front plug-in end which can be plugged securely into an axial inlet opening of a plug-in sleeve such that axial withdrawal is prevented;

said plug-in sleeve being fixed in a through-passage of a supporting structure;

a hook contour being provided at said plug-in end; and a spring element being provided in said plug-in sleeve for latching said hook contour of said support bar when said support bar is plugged into said axial inlet opening, thereby preventing axial withdrawal of said support bar from said axial inlet opening.

2. The support-bar arrangement as claimed in claim 1, wherein said hook contour includes:

a material recess located adjacent to an end surface of said plug-in end and a horizontal transverse ledge of said plug-in end said material recess being created by removing a portion of a top side of said support bar to a depth of approximately half of the thickness of said support bar between said top side and said ledge;

a V-shaped transverse indent provided between said end surface and said ledge and having a base that is oriented toward an underside of said support bar: and an edge-like transition formed between said end surface and said V-shaped indent, said edge-like transition being rounded.

3. The supporting-bar arrangement as claimed in claim 2, wherein said material recess terminates in a vertical stop which is proximate to said ledge and wherein said V-shaped indent forms said hook contour, which has a steeper portion proximate to said end surface and a less steep portion opposite said steeper portion and proximate to said vertical stop.

4. The supporting-bar arrangement as claimed in claim 1, wherein said plug-in sleeve includes a spring element in the form of a leaf spring, said spring element being inserted into a rear end of said plug-in sleeve, said spring element having a V-shaped bottom end projecting into said axial inlet opening for latching into said hook contour of said support bar; and said bottom end being not wider than said hook contour.

5. The supporting-bar arrangement as claimed in claim 4, wherein:

said plug-in sleeve includes a sleeve base provided at an end region of said plug-in sleeve and having a sleeve through-passage extending through a top region of said sleeve base;

a tongue part extends from inside said plug-in sleeve and partially into said sleeve through-passage;

said tongue part merges into a semicircular inner stop having a bottom portion that includes a horizontal shoulder;

when said plug-in end of said support bar is plugged into said axial inlet opening of said plug-in sleeve, said horizontal shoulder abuts against a horizontal transverse ledge provided on said hook contour thereby preventing rotation of said support bar relative to said plug-in sleeve; and said spring element is plugged on said tongue part and is supported in grooves provided in a sleeve part of said plug-in sleeve.

6. The supporting-bar arrangement as claimed in claim 1, wherein:

a front end of said plug-in sleeve has a positioning flange which circumscribes said axial inlet opening and is adjoined by a sleeve part of said plug-in sleeve which is provided With an external thread and two parallel flattened surfaces; and a nut is screwed onto said external thread for securing said plug-in sleeve when said plug-in sleeve is inserted into the through-passage of the supporting structure.

7. The supporting-bar arrangement as claimed in claim 1, wherein said plug-in sleeve further includes a front end and an opposite end having a sleeve base and a longitudinal horizontal axis; and said axial inlet opening slopes upwards from said sleeve base to said front end at an angle of greater than 0° relative to said horizontal axis.

8. The supporting-bar arrangement as claimed in claim 6, wherein:

said plug-in sleeve further includes elevated securing protrusions positioned behind said positioning flange and extending toward said sleeve part; and a counterflange is provided on said nut facing said positioning flange.

9. A supporting-bar arrangement for goods and services establishments for indirectly hanging articles to be displayed, comprising a support bar having a front plug-in end which can be plugged securely into an axial inlet opening of a plug-in sleeve such that axial withdrawal is prevented, said support bar forming a bracket for hanging articles indirectly, said plug-in sleeve being fixed in a through-passage of a supporting structure, a hook contour being provided at said plug-in end, and a spring element being provided in said plug-in sleeve for latching said hook contour of said support bar when said support bar is plugged into said axial inlet opening, thereby preventing axial withdrawal of said support bar from said axial inlet opening.

10. The supporting-bar arrangement as claimed in claim 1, wherein:

said plug-in sleeve includes a sleeve base provided at an end region of said plug-in sleeve and having a sleeve through-passage extending through a top region of said sleeve base;

a tongue part extends from inside said plug-in sleeve and partially into said sleeve through-passage;

said tongue part merges into a semicircular inner stop having a bottom portion that includes a horizontal shoulder;

when said plug-in end of said support bar is plugged into said axial inlet opening of said plug-in sleeve, said horizontal shoulder abuts against a horizontal transverse ledge provided on said hook contour thereby preventing rotation of said support bar relative to said plug-in sleeve; and said spring element is plugged on said tongue part and is supported in grooves provided in a sleeve part of said plug-in sleeve.

* * * * *

UNITED STATES PATENT AND TRADEMARK OFFICE
CERTIFICATE OF CORRECTION

PATENT NO.   : 6,371,313 B1
DATED        : April 16, 2002
INVENTOR(S)  : Herbert Walter and Manfred Uecker It is certified that error appears in the above-identified patent and that said Letters Patent is hereby corrected as shown below:

<u>Title page,</u>
Item [73], Assignee should be
-- Visplay IP AG, Muttenz (CH) -- rather than "Visplay IG AG, Muttenz (SE)"

Signed and Sealed this

Twenty-first Day of October, 2003

JAMES E. ROGAN
*Director of the United States Patent and Trademark Office*